United States Patent
Hunt

[19]

[11] Patent Number: 6,109,247
[45] Date of Patent: Aug. 29, 2000

[54] HEATER FOR A COLD START FUEL INJECTOR

[75] Inventor: Frank W. Hunt, White Lake, Mich.

[73] Assignee: Hitachi America, Ltd., Tarrytown, N.Y.

[21] Appl. No.: 09/399,846

[22] Filed: Sep. 21, 1999

[51] Int. Cl.[7] ................................................. F02M 31/12
[52] U.S. Cl. ...................................... 123/549; 123/179.21
[58] Field of Search .................................. 123/549, 557, 123/179.21

[56] References Cited

U.S. PATENT DOCUMENTS

| | | | |
|---|---|---|---|
| 4,366,798 | 1/1983 | Goto et al. | 123/549 |
| 4,395,994 | 8/1983 | Goto et al. | 123/549 |
| 4,407,254 | 10/1983 | Kato et al. | 123/549 |
| 4,870,249 | 9/1989 | Kayanuma et al. | 123/549 |
| 5,054,459 | 10/1991 | Reimer et al. | 123/549 |
| 5,086,747 | 2/1992 | Curhan | 123/549 |
| 5,134,986 | 8/1992 | Curhan | 123/549 |
| 5,894,832 | 4/1999 | Nogi et al. | 123/549 |

*Primary Examiner*—Marguerite McMahon
*Attorney, Agent, or Firm*—Gifford, Krass, Groh, Sprinkle, Anderson & Citkowski, P.C.

[57] ABSTRACT

A heater is provided for use in conjunction with a cold start fuel injector for an internal combustion engine in which the injector, upon activation, injects fuel into a cold start passageway. The heater includes a metal tube having an interior and an exterior surface. The tube is positioned coaxially in the cold start passageway so that fuel flow from the cold start injector passes through the interior of the metal tube. A plurality of circumferentially spaced electrical heating elements are disposed around the outer periphery of the metal tube which, upon activation, heat the metal tube thereby increasing atomization of the fuel as it flows through the interior of the tube. Preferably, the heating elements are constructed of PTC. Alternative designs are also disclosed.

28 Claims, 4 Drawing Sheets

HEATER FOR A COLD START FUEL INJECTOR

BACKGROUND OF THE INVENTION

I. Field of the Invention

The present invention relates to a heater for a cold start fuel injector for an internal combustion engine.

II. Description of the Prior Art

Governmental regulations restrict the maximum amount of hydrocarbon emissions as well as other emissions from an internal combustion engine. The most critical factor, however, affecting hydrocarbon emissions from an internal combustion engine occurs during the "cold start" phase of the engine start up. During the cold start phase, typically two minutes after engine ignition, the catalytic converter typically used in automotive vehicles is cold and, additionally, fuel enrichment is used to insure engine ignition. As such, during a cold start of the engine, the air/fuel ratio is much richer than stoichiometric combustion, typically 10–14:1. Furthermore, up to 50% of the hydrocarbon emissions permitted by government regulations can occur during the first 20 seconds following engine ignition.

In order to reduce hydrocarbon emissions, it is desirable to start the engine in a stoichiometric or lean state with an air/fuel ratio in the range of 14.5–16.1 depending upon the engine cylinder design and fuel composition. The spark timing is also typically retarded in order to effectively transfer heat from the combustion chamber to the catalyst in order to more quickly warm up the catalyst in the catalytic converter.

In order to provide a leaner fuel mixture during the cold start phase following engine ignition, there have been a number of previously known devices associated with cold start fuel injectors to vaporize the fuel from the cold start fuel injector prior to its induction into the engine cylinder. Vaporization of the fuel from the cold start fuel injector, of course, enables a leaner air/fuel mixture to be inducted into the engine cylinders while still insuring engine ignition during a cold start condition. However, these previously known heaters have not proven wholly satisfactory in operation.

SUMMARY OF THE PRESENT INVENTION

The present invention provides a heater for use with a cold start fuel injector of an internal combustion engine which overcomes the above-mentioned disadvantages of the previously known devices.

In brief, the heater for the cold start fuel injector of the present invention comprises an elongated metal tube having an interior and an exterior surface. The tube is positioned within the cold start fuel passageway so that the interior of the tube is coaxial with the cold start fuel passageway. An annular flange is provided at each end of the tube and the outer periphery of each flange engages the inner walls defining the cold start fuel passageway. These flanges serve not only to mount the tube within the interior of the cold start fuel passageway, but also to insure that all of the fuel flow from the cold start fuel injector passes through the interior of the tube.

At least one and preferably several circumferentially spaced electrical heating elements are mounted to the outer periphery of the metal tube. Upon activation, these heating elements heat the tube so that fuel from the cold start fuel injector impinging upon the interior of the tube becomes vaporized in the desired fashion.

Preferably, the heating elements comprise strips of PTC (positive temperature coefficient) ceramic material. Such heating elements exhibit a dramatic increase in their electrical resistance when the heating element reaches its Curie point (approximately 170° centigrade) thus facilitating control of the heating elements within preset temperature limits. Such limitation of the heating elements within a preset range of temperature is desirable to prevent undesirable ignition of the fuel within the metal tube.

Alternatively, the tube can be heated using resistive heating elements, such as nichrome, a PTC film or by inductive heating.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
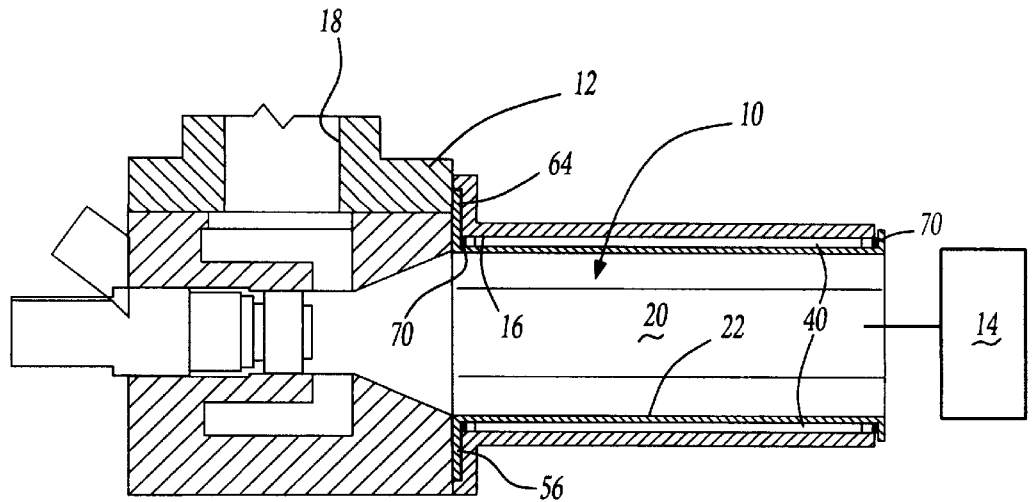
FIG. 1 is a diagrammatic view illustrating a preferred embodiment of the present invention.

With reference first to FIG. 1, a preferred embodiment of the heater 10 of the present invention is there shown for use with a cold start fuel injector 12 of an internal combustion engine 14 (illustrated diagrammatically). Upon activation, the cold start fuel injector 12 injects fuel into a generally cylindrical cold start fuel passageway 16 which is fluidly connected with the intake manifold of the engine 14. In the conventional fashion, auxiliary air is introduced through a port 18 so that the auxiliary air mixes with the fuel from the cold start fuel injector 12 prior to its induction into the combustion chambers of the engine 14.

Figure 4:
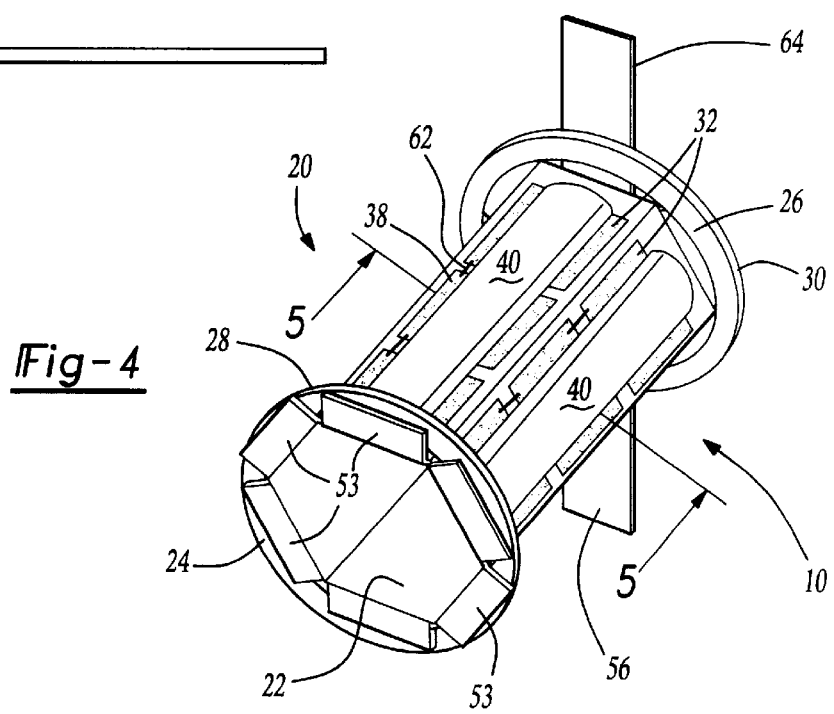
FIG. 4 is an elevational view illustrating the preferred embodiment of the present invention.
Figure 5:
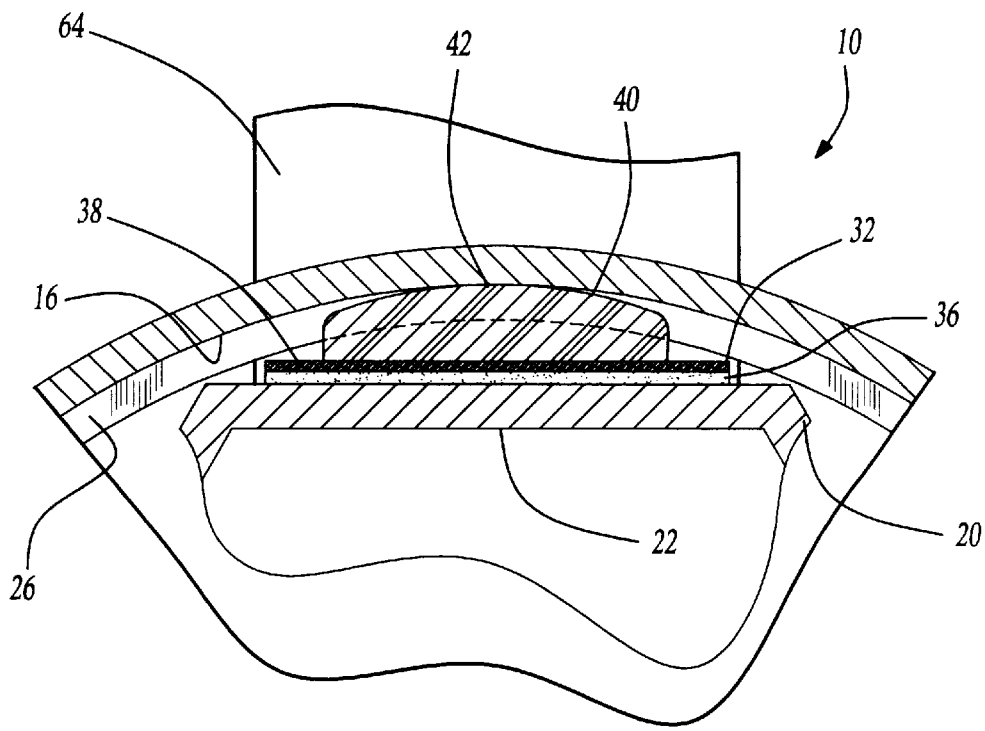
FIG. 5 is a sectional view taken substantially along line 5—5 in FIG. 4 and enlarged for clarity.

With reference now to FIGS. 1, 4 and 5, the heater 10 is there shown in greater detail and comprises an elongated metal tube 20 which is preferably constructed of brass although other materials may alternatively be used. The tube 20, furthermore, is formed into a polygonal, and preferably hexagonal, shape such that an interior 22 of the tube 20 is coaxially aligned with the cold start fuel passageway 16.

As best shown in FIGS. 1 and 4, the heater 10 further includes a pair of annular flanges 24 and 26 with one flange secured to each end of the tube 20 preferably by soldering. Each flange 24 and 26 is constructed of any suitable material, such as metal, and has an outer circular periphery 28 and 30, respectively, which abut against the interior of the cold start fuel passageway 16 (FIG. 1). The flanges 24 and 26 thus serve two purposes. First, the flanges 24 and 26 serve to mount the metal tube 20 within the passageway 16 such that the tube 20 is spaced radially inwardly from the cold start fuel passageway 16. Secondly, the flanges 24 and 26 effectively seal the ends of the tube 20 to the passageway 16 thus forcing all fuel flow from the injector 12 as well as the air flow from the auxiliary air port 18 through the interior 22 of the tube 20.

As best shown in FIGS. 4 and 5, at least one and preferably several circumferentially spaced electrical heating elements 32 are preferably secured in a fashion to be subsequently described to the outer periphery of the tube 20. Preferably, at least one heating element 32 is provided on each flat of the polygonal tube 20. Furthermore, although the heating elements 32 are preferably secured to the outer periphery of the tube 20, alternatively, the heating elements 32 can be secured to the inner periphery of the tube 20.

In the preferred embodiment of the invention, each heating element 32 is made of PTC (positive temperature coefficient) material which becomes heated in response to current flow. Other types of heating elements, such as nichrome wire, PTC film and the like, can be alternatively used. Alternatively, the tube 20 can be heated by inductive heating.

As best shown in FIG. 5, the heating elements 32 are preferably secured to the metal tube 20 by solder 36. Additionally, an electrode 64 (subsequently described in greater detail) is electrically connected to each heating element 32. Consequently, when a voltage potential is imposed between the electrode 64 and the metal tube 20, the heating elements 32 become heated and transfer this heat to the metal tube 20.

Still referring to FIG. 5, in order to prevent the electrode 64, and thus the heating elements 32, from becoming electrically shorted, a longitudinally extending electrical insulating strip 40 is provided on each heating element 32 adjacent or over the electrode 64. Each insulating strip 40 includes an outer periphery 42 which conforms in shape to the inner wall of the cold start fuel passageway 16. These strips 40, which are preferably constructed of plastic, thus not only insulate the heating elements 32 and electrodes 64 from the cold start fuel passageway 16, but also protect the heater 10 from vibration and other mechanical shock.

Figure 2A:
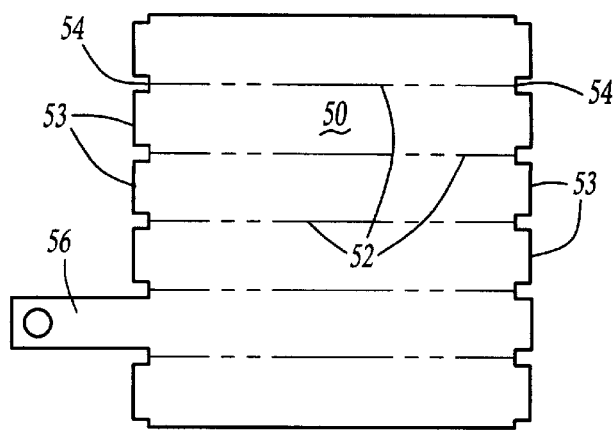
FIG. 2a–FIG. 2f are plan views illustrating a method of construction for the preferred embodiment of the present invention.

With reference now to FIGS. 2a–2e, the steps of manufacturing a preferred embodiment of the heater of the present invention are there shown in greater detail. In FIG. 2a, a flat metal substrate 50 is formed which will ultimately form the polygonal tube 20 when bent along fold lines 52. A plurality of notches 54 are provided along each side of the substrate 50 so that a pair of notches 54 are aligned with each bend line 52 and a tab 53 is formed between each pair of notches 54. A connecting tab 56 extends outwardly from one side of the substrate 50.

Figure 2B:
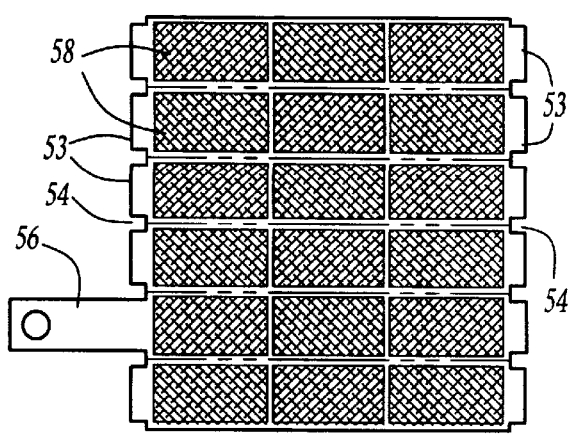

With reference now to FIG. 2b, at least one and preferably three aligned solder patches 58 are then deposited on one surface of the substrate 50 between adjacent pairs of fold lines 52 so that three columns by six rows of patches 58 are deposited on the substrate 50. Consequently, as illustrated, eighteen solder patches 58 are deposited on the substrate 50, although more or fewer solder patches 58 can be used depending upon the number of sides of the tube 20 and number of patches 58 per side.

Figure 2C:
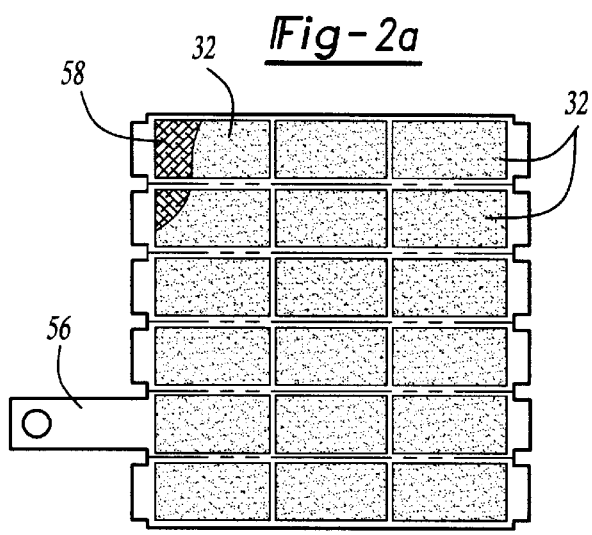

With reference now to FIG. 2c, one electrical heating element 32 is mounted to each solder patch 58. The heating elements 32, preferably PTC ceramic material, may be efficiently soldered to the metal stamping 52 by mounting the heating elements 32 on the solder patches 58 and then heating the resulting structure on a hot plate until the solder forming the solder patch 58 liquefies thus bonding the heating elements 32 to the metal stamping 50.

Figure 3:
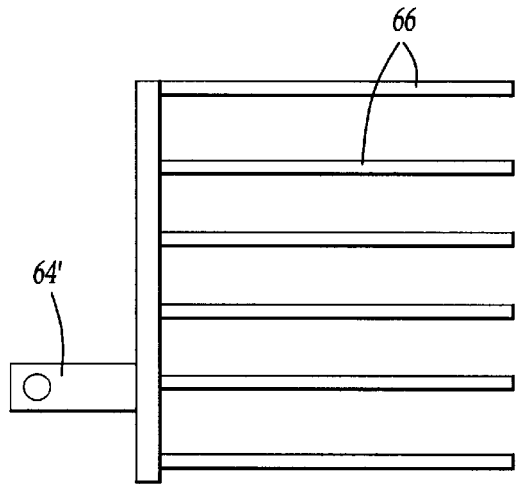
FIG. 3 is a plan view illustrating a second preferred embodiment of the present invention.
Figure 2D:
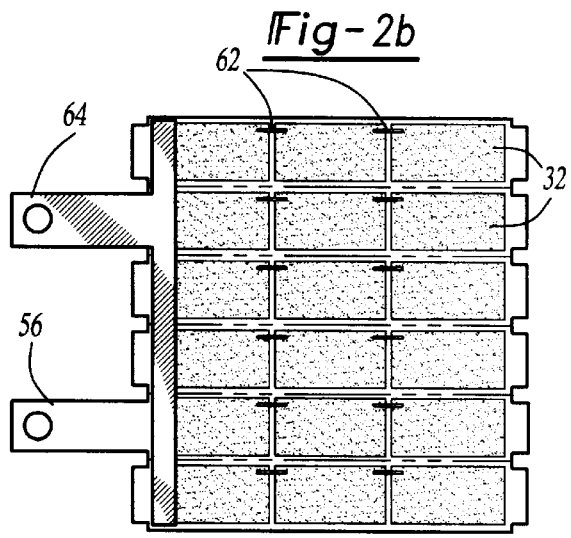

With reference now to FIG. 2d, after the heating elements 32 are soldered to the metal stamping 50, the heating elements 32 in the middle column of each row of heating elements 32 are electrically connected by wires 62 to the adjacent heating elements 32 on the outer columns of heating elements 32. An elongated metal electrode 64 having an outwardly extending connecting tab 65 is also secured to each heating element 32 in one outside column such that all of the heating elements 32 are electrically connected together. Alternatively, as best shown in FIG. 3, the electrode 64' may include elongated conducting leads 66 which replace the connecting wires 62. In either event, however, the electrode 64 is electrically connected to an outer side of each heating element 32 while the metal substrate 50 which ultimately forms the tube 20 is electrically connected to the opposite or inner side of the heating elements 32.

Figure 2E:
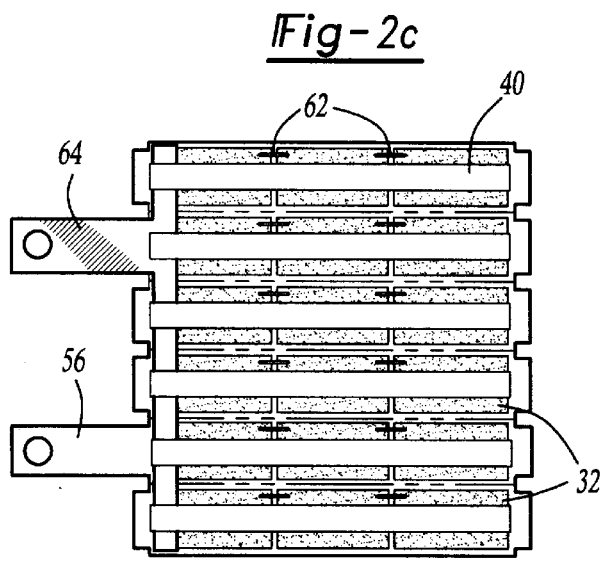

With reference now to FIG. 2e, after the electrode 64 electrically connects the heating elements 32 together, one electrical insulating strip 40 is then secured along each row of the heating elements 32. As shown in FIG. 2e, each insulating strip 40 may be positioned to one side of the electrical connecting wire 62 or, alternatively, the electrical insulating strip may overlie the wires 32.

Figure 2F:
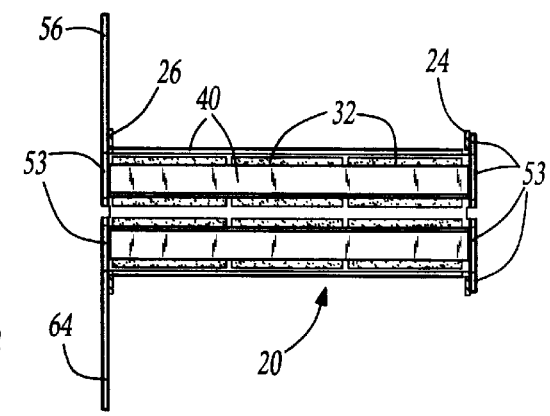

With reference now to FIG. 2f, the metal stamping 50 is then formed into the polygonal tube 20 by bending the stamping 50 into the polygonal shape. The annular flanges 24 and 26 are then positioned over opposite ends of the metal tube 20 and the tabs 53 (FIGS. 2a and 4) are then bent around the ends of the annular flanges 24 and 26 and soldered in place thus securing the flanges 24 and 26 to the tube 20. The positive electrode 64 and ground electrode 56 are also bent so that the electrodes 56 extend radially outwardly from the tube 20. Furthermore, electrical insulating gaskets 70 (FIG. 1) are sandwiched in between the electrodes 56 and 64 as well as in between the housing forming the cold start fuel passageway 16 in order to isolate the electrodes 56 and 64 from each other as well as from the housing.

Although in the preferred embodiment of the invention, the insulator strips 40 are used to provide electrical insulation between the positive electrode 64 and/or heating elements 32 and the housing, alternatively a tubular electrical insulator may be inserted into the housing around the heater 10 to perform the same function.

Figure 6:
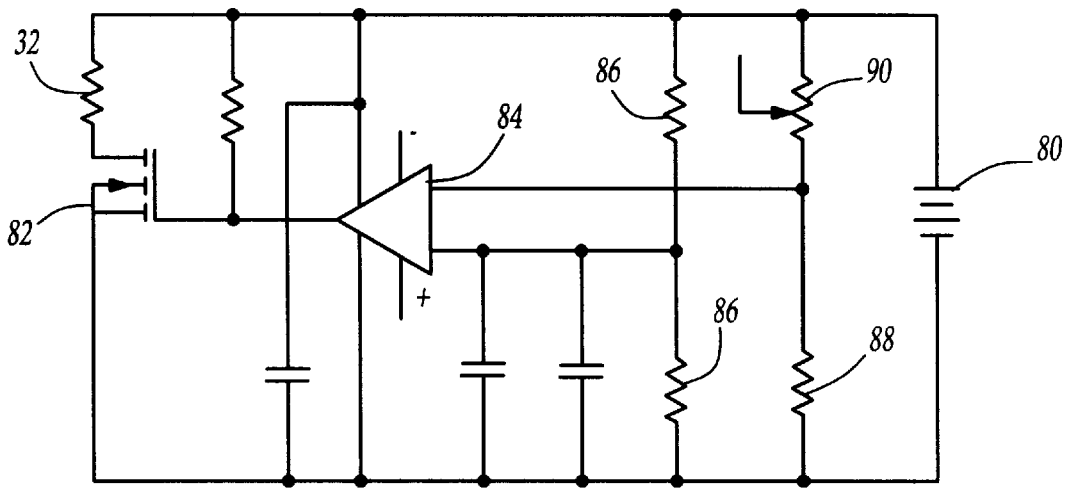
FIG. 6 is a schematic view illustrating a temperature controlled circuit for use with the preferred embodiment of the present invention.

With reference now to FIG. 6, a preferred embodiment of a heater control circuit is there shown for controlling the temperature of the heating elements 32. In FIG. 6, the heating elements 32 are electrically connected in series between a battery 80 and an electronic switch 82, such as a MOSFET. A comparator 84 has its output connected to the switching input of the electronic switch 82 so that, whenever the output from the comparator 84 is positive, the switch 82 is conductive thus enabling current to flow through the heating elements 32.

In order to control the comparator 84, a pair of resistors 86 form a divider network between the battery 80 to provide a constant input, e.g. six volts, to the negative input of the comparator 84. Similarly, a second resistor divider circuit comprising a fixed resistor 88 as well as a PTC temperature sensor 90 are connected in series with the battery 80. The node between the PTC temperature sensor and the resistor 88 is electrically connected to the positive input of the comparator 84.

The PTC temperature sensor 90 is thermally connected to one of the heating elements 32 and/or the metal tube 20. In the well known fashion, the electrical resistance of the PTC material which forms the sensor 90 increases dramatically when the PTC material reaches its Curie point, e.g. 160° centigrade. When this occurs, the voltage input to the positive input of the comparator 84 drops below the negative input from the voltage provided by the two resistors 86 thus turning off the switch 82 and terminating current flow through the electrical heating elements 32. That will result in immediate cooling of the heating element 32 until the resistance exhibited by the heat sensor 90 falls below the value of the resistor 88 thus again turning on the switch 82. In this fashion, by iteratively connecting and disconnecting the heating elements 32 to the battery 80, the temperature of the heating elements 32 can be maintained within a narrow temperature range.

Figures 7, 8:
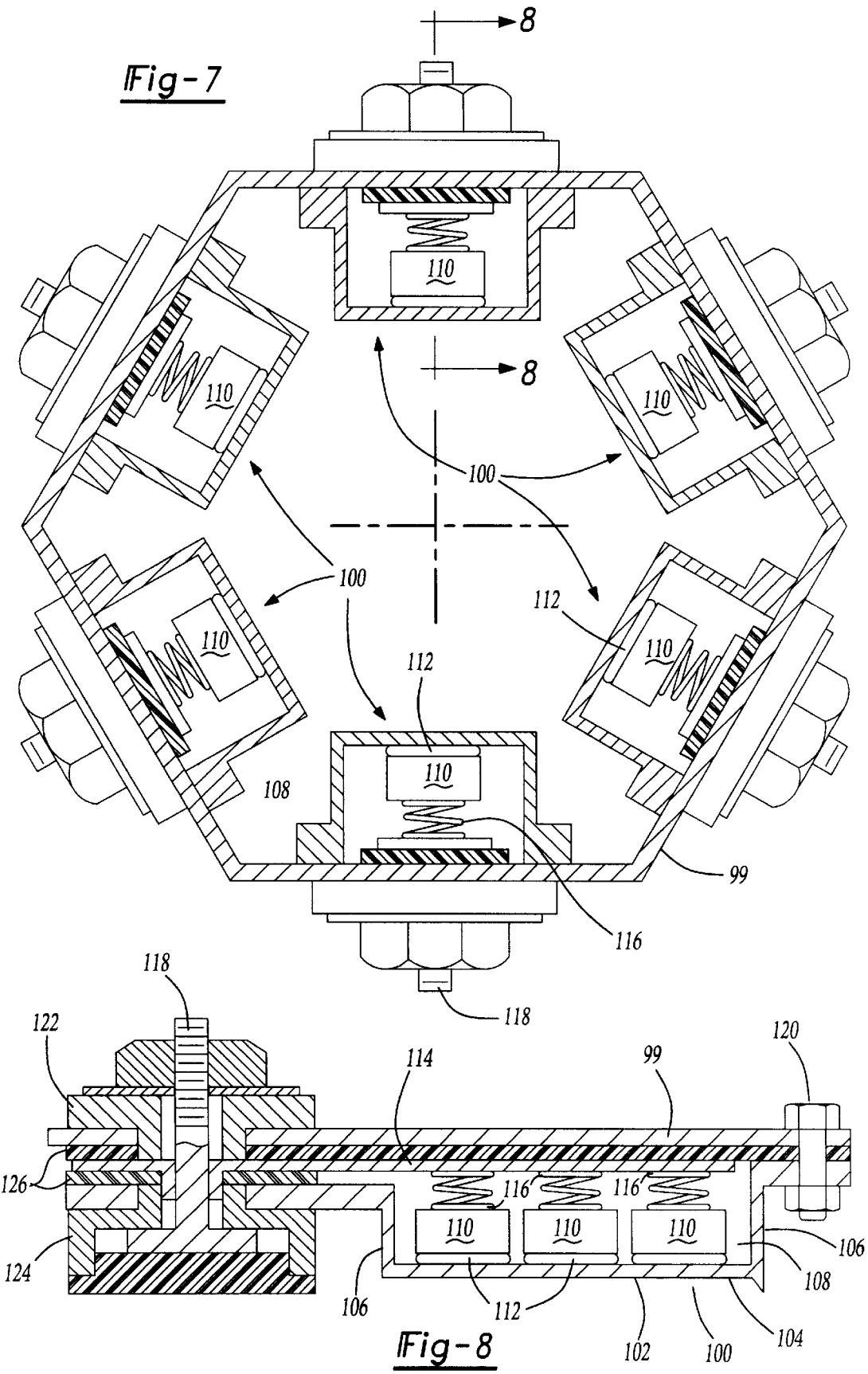
FIG. 7 is a cross-sectional view illustrating a second preferred embodiment of the invention.
FIG. 8 is a fragmentary longitudinal view of the second preferred embodiment of the invention.

With reference now to FIGS. 7 and 8, a modification of the present invention is there shown in which six independent heater assemblies 100 are mounted within the fuel passageway 16. Each heater assembly 100, furthermore, is substantially identical to the other so that a description of only one heater assembly 100 is necessary, a like description being applicable to the other heater assemblies 100.

The heater assembly 100 includes a metal housing 102 having a bottom wall 104 and side walls 106. The housing 102 thus forms a generally rectangular chamber 108. Additionally, the housing 102 is made of a highly thermal conductive material, preferably metal and even more preferably made of brass.

At least one, and preferably three, heating elements 110 are positioned within the chamber 108 and have one side secured to the housing bottom wall 104 by solder 112, glue or any conventional means. Preferably, the heating elements 110 comprise PTC material and their direct contact with the bottom wall 102 through the solder 112 ensures high heat conduction from the heating elements 110 to the housing bottom wall 104.

An electrical electrode 114 is electrically connected to the side of the heating elements 110 opposite from the housing bottom wall 104 by electrical connectors 116. Preferably, the electrical connectors 116 comprise a compression spring. The electrical electrode 114, furthermore, is electrically connected to a metal terminal 118.

The housing 102, in turn, is electrically connected to the tube 99 which forms the air flow passageway 16 by connecting bolt and nut assembly 120. The opposite end of the housing 102 is mechanically connected to the terminal 118 but is electrically insulated from the terminal 118 by plastic caps 122 and 124 and electrically nonconductive bushings 126.

In operation, the terminal 118 is connected to a source of electrical power so that current flows through the electrode 114 and electrical heating elements 110 thus heating the bottom wall 104 of the housing 102. The air/fuel mixture flowing through the cold start fuel passageway impinges upon the housings 102 which vaporizes the fuel in the mixture in the desired fashion.

A primary advantage of the embodiment of the invention illustrated in FIGS. 7 and 8 is that the individual heating assemblies 100 may be separately constructed and then simply assembled to the housing for the cold start fuel passageway.

From the foregoing, it can be seen that the heater of the present invention provides a simple yet effective heater for use with a cold start fuel injector which exhibits a high efficiency transfer of heat from the heating elements and to the metal tube. Since the metal tube is ultimately in contact with the fuel emitted by the cold start fuel injector, the efficient vaporization of the fuel is achieved.

Having described my invention, however, many modifications thereto will become apparent to those skilled in the art to which it pertains without deviation from the spirit of the invention as defined by the scope of the appended claims.

I claim:

1. For use in conjunction with a cold start fuel injector for an internal combustion engine in which the injector, upon activation, injects fuel into a cold start fuel passageway, a heater comprising:

a metal tube having an interior and an exterior surface, said tube being positioned in the cold start fuel passageway such that fuel flow through the passageway flows through said interior of said metal tube, and a plurality of heating elements circumferentially spaced around said outer surface of said tube, wherein said heating elements are soldered to said tube.

2. The invention as defined in claim 1 wherein said heating element comprises a ceramic heating element.

3. The invention as defined in claim 2 wherein said heating elements are made of PTC.

4. The invention as defined in claim 1 wherein said heating element is a resistive wire heater.

5. The invention as defined in claim 1 wherein said tube is polygonal in cross-sectional shape thus having a plurality of flat surfaces.

6. The invention as defined in claim 5 wherein one heating element is mounted to each flat surface of said tube.

7. The invention as defined in claim 6 and comprising at least two longitudinally aligned heating elements mounted to each flat surface of said tube, said heating elements being electrically connected together.

8. The invention as defined in claim 6 and comprising an electrode electrically connected to each heating element.

9. The invention as defined in claim 6 and comprising an electrode electrically connected to one heating element on each flat surface of said tube, and an electrically conductive wire(s) which electrically connect the heating elements on each flat surface together.

10. The invention as defined in claim 1 wherein the cold start fuel passageway is generally cylindrical in shape and comprising a plurality of electrical insulator strips circumferentially spaced around said tube and positioned between said heating elements and said cold start passageway to thereby electrically isolate said heating elements from said passageway.

11. The invention as defined in claim 10 wherein an outer periphery of each insulator strip conforms in shape to the shape of said passageway.

12. The invention as defined in claim 1 wherein said tube is made of brass.

13. The invention as defined in claim 1 wherein said tube is made of aluminum.

14. The invention as defined in claim 1 and comprising an annular flange secured to each end of said tube, said flange having an outer periphery in contact with said passageway so that all fuel flow through said passageway pass through said interior of said tube.

15. The invention as defined in claim 1 and comprising a circuit which maintains the temperature of said heating element within a predetermined range.

16. For use in conjunction with a fuel injector for an internal combustion engine in which the injector, upon activation, injects fuel into a fuel passageway, a heater comprising:

a plurality of heating assemblies, each heating assembly having a housing and said housings being positioned in the cold start fuel passageway such that said housings are circumferentially spaced around said passageway and said housings are circumferentially spaced apart from each other, at least one electrical heating element mounted on each said housing, wherein fuel flow through said passageway impinges on said housings.

17. The invention as defined in claim 16 wherein said heating assembly comprises a metallic housing defining an interior chamber and at least one electrical heating element contained in said chamber and thermally coupled to said housing.

18. The invention as defined in claim 16 wherein each said housing includes a bottom wall and spaced side walls, said bottom wall and side walls forming a chamber in which said at least one heating element is contained.

19. For use in conjunction with a cold start fuel injector for an internal combustion engine in which the injector, upon activation, injects fuel into a cold start fuel passageway, a heater comprising:

a metal tube having an interior and an exterior surface, said tube being positioned in the cold start fuel passageway such that fuel flow through the passageway flows through said interior of said metal tube, and a plurality of heating elements circumferentially spaced around said outer surface of said tube, wherein the cold start fuel passageway is generally cylindrical in shape and comprising a plurality of electrical insulator strips circumferentially spaced around said tube and positioned between said heating elements and said cold start passageway to thereby electrically isolate said heating elements from said passageway.

20. The invention as defined in claim 19 wherein said heating element comprises a ceramic heating element.

21. The invention as defined in claim 20 wherein said heating elements are made of PTC.

22. The invention as defined in claim 19 wherein said heating element is a resistive wire heater.

23. The invention as defined in claim 19 wherein said tube is polygonal in cross-sectional shape thus having a plurality of flat surfaces.

24. The invention as defined in claim 23 wherein one heating element is mounted to each flat surface of said tube.

25. The invention as defined in claim 24 and comprising at least two longitudinally aligned heating elements mounted to each flat surface of said tube, said heating elements being electrically connected together.

26. The invention as defined in claim 24 and comprising an electrode electrically connected to each heating element.

27. The invention as defined in claim 24 and comprising an electrode electrically connected to one heating element on each flat surface of said tube, and an electrically conductive wire(s) which electrically connect the heating elements on each flat surface together.

28. The invention as defined in claim 19 wherein an outer periphery of each insulator strip conforms in shape to the shape of said passageway.

\* \* \* \* \*

UNITED STATES PATENT AND TRADEMARK OFFICE
CERTIFICATE OF CORRECTION

PATENT NO. : 6,109,247
DATED : Aug. 29, 2000
INVENTOR(S) : Frank W. Hunt, et al.

It is certified that error appears in the above-identified patent and that said Letters Patent are hereby corrected as shown below:

Front Page, Inventor - "After "Frank W. Hunt, White Lake Mich." insert --, Shigeru Oho, Farmington Hills, Mich.--

Signed and Sealed this

Twenty-fourth Day of April, 2001

*Attest:*

NICHOLAS P. GODICI

*Attesting Officer*   Acting Director of the United States Patent and Trademark Office